United States Patent [19]

Hamatani

[11] Patent Number: 4,723,648

[45] Date of Patent: Feb. 9, 1988

[54] HIGH SPEED ROTATIONAL SUPPORTING DEVICE

[75] Inventor: Tohru Hamatani, Ciba, Japan

[73] Assignee: Hi-Tec Seiko Company Ltd., Chiba, Japan

[21] Appl. No.: 711,808

[22] Filed: Mar. 14, 1985

[51] Int. Cl.⁴ .............................. B65G 47/24
[52] U.S. Cl. ........................ 198/379; 198/803.01; 198/465.1; 360/99; 369/270
[58] Field of Search ............... 198/345, 346.1, 346.2, 198/379, 803.01, 803.12, 394, 803.15, 465.1; 29/33 P, 563; 360/97, 99; 369/270; 82/1.1, 2 A

[56] References Cited

U.S. PATENT DOCUMENTS

| | | | |
|---|---|---|---|
| 3,448,845 | 6/1969 | Beck et al. | 198/378 |
| 3,812,953 | 5/1974 | Maschke | 198/803.15 |
| 3,946,884 | 3/1976 | Kato et al. | 198/803.12 X |
| 4,300,975 | 11/1981 | Scott | 198/803.12 X |
| 4,492,301 | 6/1985 | Inaba et al. | 198/465.1 |
| 4,575,837 | 3/1986 | Okita | 369/270 |
| 4,627,288 | 12/1986 | Guzik et al. | 360/97 X |
| 4,637,010 | 1/1987 | Okita | 360/99 X |

Primary Examiner—Robert J. Spar
Assistant Examiner—Cheryl L. Gastineau
Attorney, Agent, or Firm—Shlesinger, Arkwright & Garvey

[57] ABSTRACT

A high speed rotational support is provided by a floating shaft having a circumferentially extending flange and which is disposed between two opposed rotating shafts each of which engage an opposite end of the floating shaft and one of which moves into direct engagement with a piece which is supported on the flange.

10 Claims, 11 Drawing Figures

HIGH SPEED ROTATIONAL SUPPORTING DEVICE

BACKGROUND OF THE INVENTION

This invention relates to a high speed rotational supporting device for a disk such as a floppy disk.

In a process of producing, for example, floppy disks, an operation for working a surface of a disk or for contacting an inspection tool with a disk is carried out while the disk is being rotated during a polishing or inspection step of the disk. In achieving such operations, increase of the rotational speed is desired in order to improve the working efficiency.

Figure 1:
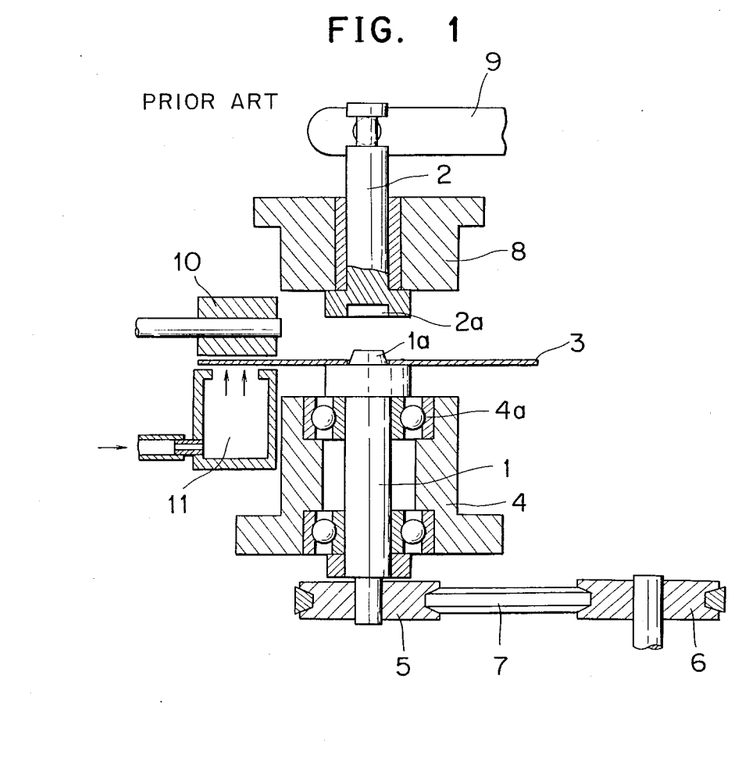
FIG. 1 is a cross sectional view illustrating a typical one of conventional high speed rotational supporting devices for disks.

Referring to FIG. 1 which illustrates a typical one of conventional high speed rotational supporting devices for disks, a movable rotary shaft 2 is mounted in coaxial relationship and for movement into and out of engagement with a stationary rotational shaft 1 such that a floppy disk 3 is clamped between opposing end faces of the rotational shafts 1 and 2. The stationary rotary shaft 1 is supported for rotation on a housing 4 by means of bearings 4a and is driven by a belt 7 extending between a pulley 5 thereon and another pulley 6 of a prime mover. Meanwhile, the movable rotary shaft 2 is supported for rotation and also for sliding movement by means of a housing 8 and is moved up and down by an actuating lever 9. A pressing up mechanism 11 is provided for pressing a disk 3 against an operating head 10 such as a magnetic head or a polishing roll.

In the device having such a construction as described above, if a floppy disk 3 clamped between the rotational shafts 1 and 2 is rotated at a high speed, it may make eccentric rotation and thus produce vibrations since a slightest dislocation between the axes of the shafts 1 and 2 cannot be avoided. As a result, there may be such defects as deviations in working accuracy, appearance of friction between an end face of either or each shaft and a contact face of the disk, and damage to bearings at supporting portions for the shafts.

SUMMARY OF THE INVENTION

The present invention has been made in consideration of such defects of the prior art devices and resides in a high speed rotational supporting device which is improved to eliminate those defects of the prior art devices by consituting the same such that a floating rotary shaft is provided between two rotary shafts which are supported for movement into and out of engagement with each other on a housing so as to allow a disk to be clamped by the floating rotary shaft thereby to allow any dislocation of the axes between the two rotary shafts to be ignored.

DETAILED DESCRIPTION OF THE EMBODIMENTS

Figure 2:
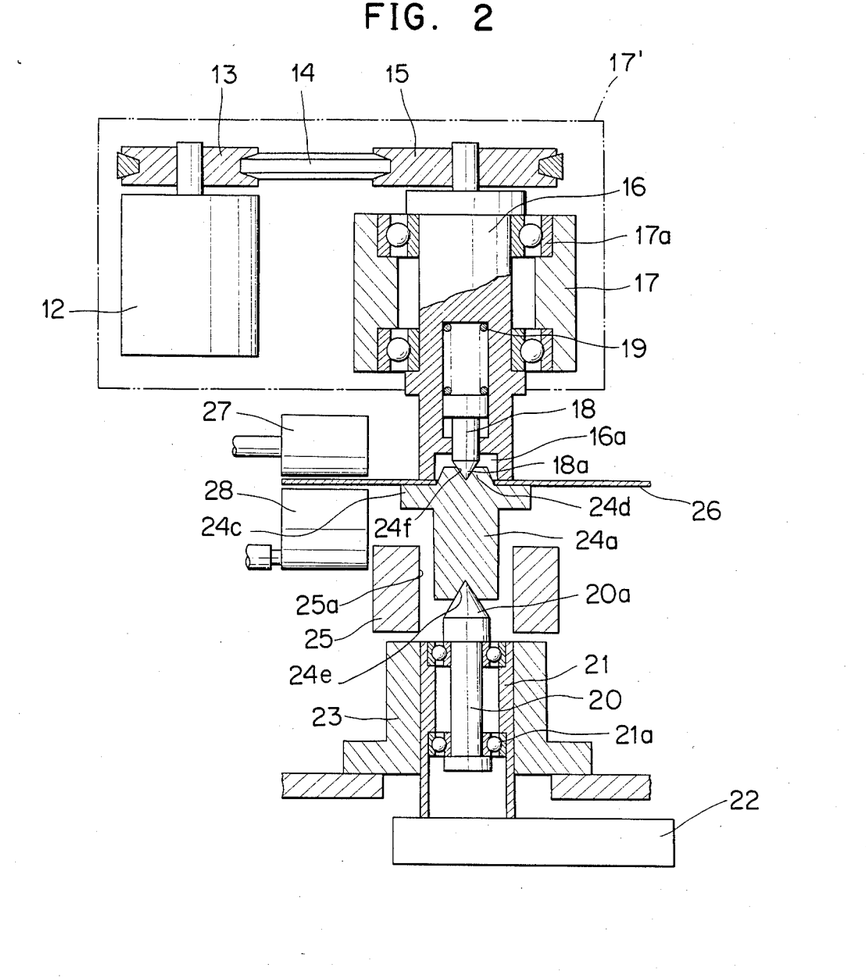
FIG. 2 is a cross sectional view illustrating a high speed rotational supporting device for disks according to the present invention.

Now, an embodiment of the present invention will be described with reference to the accompanying drawings. Referring to FIG. 2, the high speed rotational supporting device includes a prime mover 12, and an upper rotary shaft to which power of the prime mover 12 is transmitted by way of a pulley 13, a belt 14 and another pulley 15. The upper rotary shaft 16 is supported for rotation on a housing 17 by means of bearings 17a. An engaging element 18 having a conical engaging projection 18a thereon is providing at a lower end of the upper rotary shaft 16 and is urged downwardly by a spring 19. These elements from the prime mover 12 to the housing 17 are provided within another housing 17' which can be moved up and down by means of a pneumatic mechanism (not shown) to move the upper rotary shaft 16 in an axial direction.

Meanwhile, a lower rotary shaft 20 is supported for rotation on a holder 21 by means of bearings 21a. The holder 21 is moved within a further housing 23 by a pushing up member 22 operated by a pneumatic mechanism. A conical engaging projections 20a is formed at an upper end of the lower rotary shaft 20.

Figure 3:
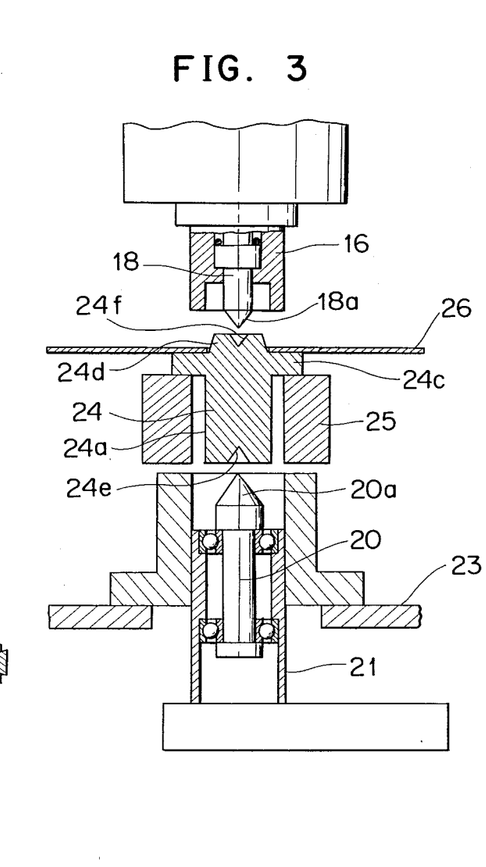
FIG. 3 is a cross sectional view of essential part of the high speed rotational supporting device of FIG. 2 in a non-clamping position.

The upper and lower rotary shafts 16 and 20 are disposed in concentrical but spaced apart relationship with each other, and a floating shaft 24 is interposed between the upper and lower rotary shafts 16 and 20, and is supported at a flanged portion 24c thereof on a support 25 such that it can be moved floatingly by a small distance in a hole 25a formed in the support 25 (FIG. 3). The floating shaft 24 is pushed up by the lower rotary shaft 20 when the latter is moved up.

The flange portion 24c of the floating shaft 24 provides a supporting face for a disk 26 and has an engaging projection 24d formed in the center thereof for supporting thereon a disk 26 in a center hole thereof. The engaging projection 24d has formed at the center thereof a conical engaging recess 24f into which the conical engaging propection 18a of the engaging element 18 can be engaged. Meanwhile, the floating shaft 24 has formed at a lower end thereof another conical engaging recess 24e into which the conical engaging projection 20a of the lower rotary shaft 20 can be engaged.

A pushing up mechanism 28 is also provided for pressing a disk 26 against an operating head 27.

In the device having such a construction as described above, a disk 26 is placed on the flanged portion 24a of the floating shaft 24 in a condition as shown in FIG. 3, and the upper and lower rotary shafts 16 and 20 are moved down and up into engagement with the upper and lower ends of the floating shaft 24, respectively, while the floating shaft 24 is spaced away from the support 25 to clamp the disk 26 between the upper rotary shaft 16 and the floating shaft 24. In this construction, while the upper and lower rotary shafts 16 and 20 are both moved, it is otherwise possible to move only one of them for movement.

Figure 4:
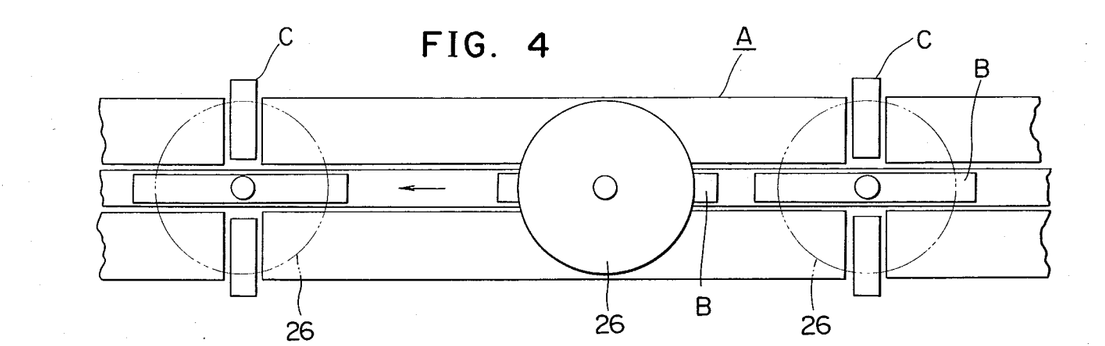
FIG. 4 is a plan view illustrating a general construction of another embodiment of the present invention put into practice in the form of a transporting system.
Figure 5:
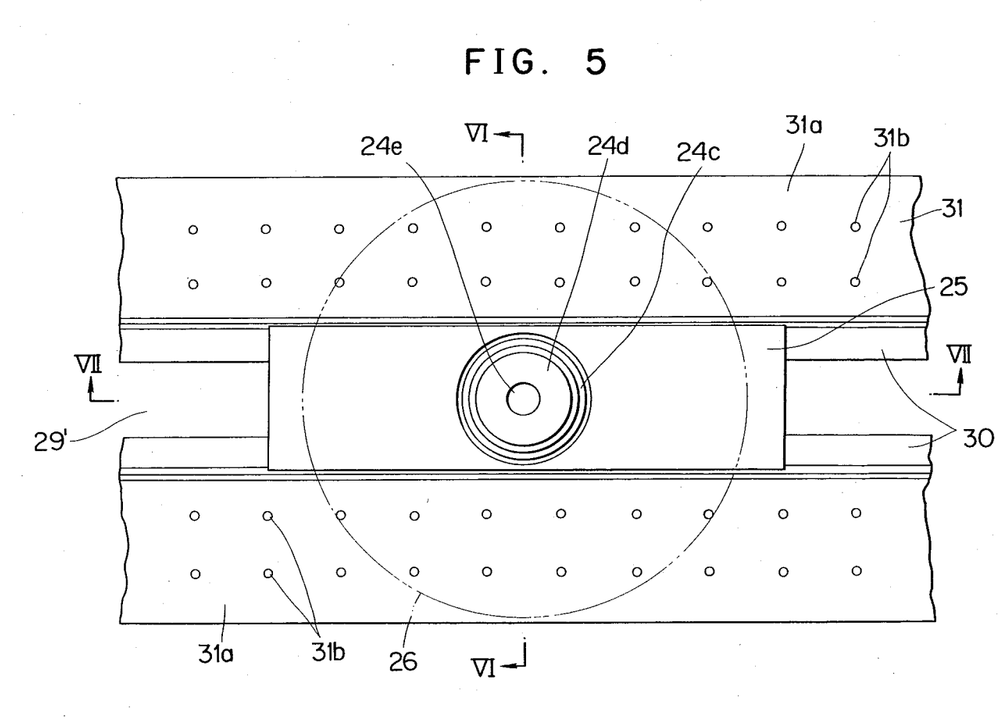
FIG. 5 is an enlarged plan view of FIG. 4.
Figure 6:
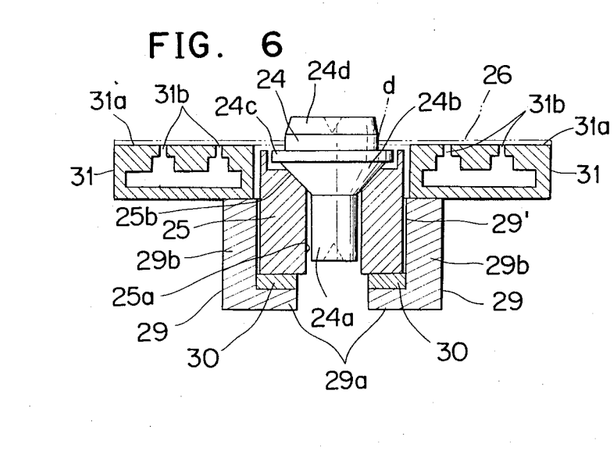
FIG. 6 is a cross sectional view taken along line VI of FIG. 5.

Another embodiment of the present invention will now described with reference to FIGS. 4 through 8b. Transporting tables 29 depicted in FIG. 6 are located in opposing relationship with a gap left therebetween to define a channel 29' extending in a longitudinal direction therebetween as shown in FIG. 4. A pair of belt conveyors 30 are supported for circulating movement on bottom walls 29a of the transporting tables 29. A pair of air blow-out tables 31 are secured to side walls 29b of the transporting tables 29. Upper faces 31a of the air blow-out tables 31 are located within a plane, and a great number of air blowout holes 31b are formed in equidistantly spaced relationship in the air blow-out tables 31.

Supports 25 are located on the belt conveyors 30 within the channel 29' in the form of carrier block 25. Each carrier 25 has a circular through hole 25a formed to extend vertically through the center thereof. The support hole 25a has a conical section and cylindrical section extending from a converging end thereof. Said conical section has support face 25.

A floating shaft 24 is supported in the support hole 25a of the carrier 25 and has a cylindrical portion 24a adapted to be inserted in the through hole 25a, a conical engaging portion 24b adapted to be closely contacted with the supporting face 25b, a circular flange portion 24c located just above the conical engaging portion 24b and providing a support face for a disk member, and a circular projection 24d provided at the center of the flange portion 24c. Conical engaging recesses 24e and 24f are formed at the centers of a lower face of the cylindrical portion 24a and an upper face of the circular projection 24d of the floating shaft 24, respectively. Thus, the floating shaft 24 is transported with the axial center thereof held in register with the center of the through hole 25a of the carrier 25.

A radial gap is provided between the through hole 25a of the carrier 25 and the floating shaft 24 and when the floating shaft 24 is to be positioned, the floating shaft 24 is pushed up to move the conical engaging portion 24b of the floating shaft 24 away from the carrier 25 until the holder 24 is positioned by engagement of an engaging element 18 which will be described below and an engaging projection 20a with the engaging recesses 24e and 24f of the floating shaft 24 respectively. Accordingly, an error up to the above described gap can be allowed as the accuracy for stopping a pallet at a working station.

Figure 7:
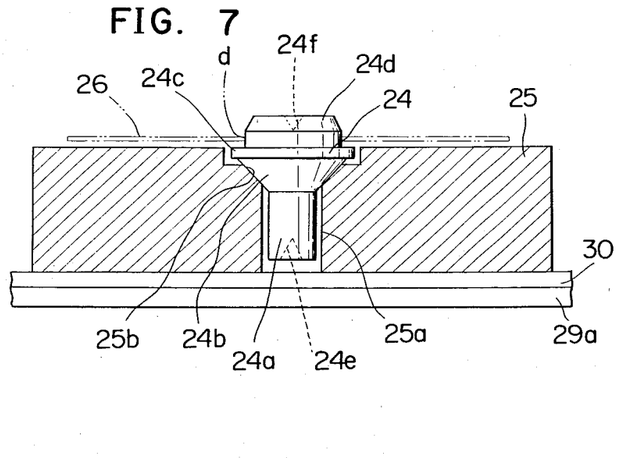
FIG. 7 is a cross sectional view taken along line VII of FIG. 5.
Figure 8A:
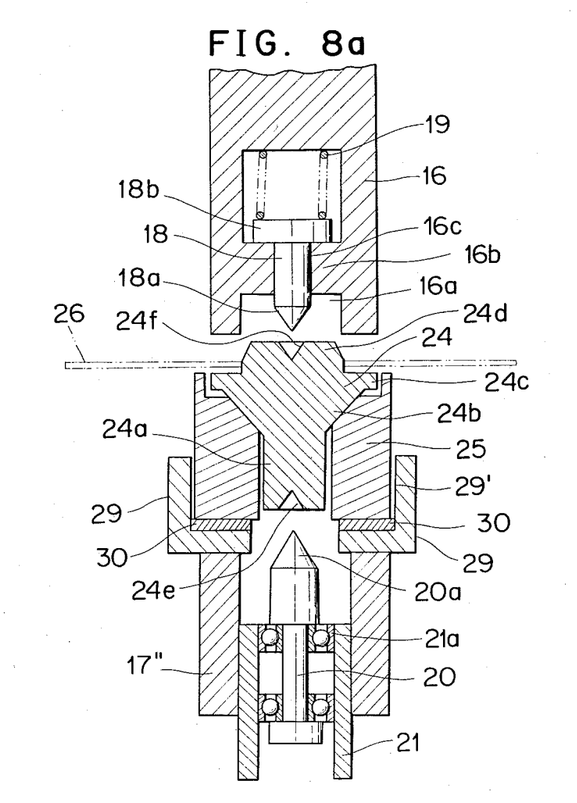
FIG. 8a and FIG. 8b are cross sectional views of a positioning rotating mechanism at a stopping portion.
Figure 8B:
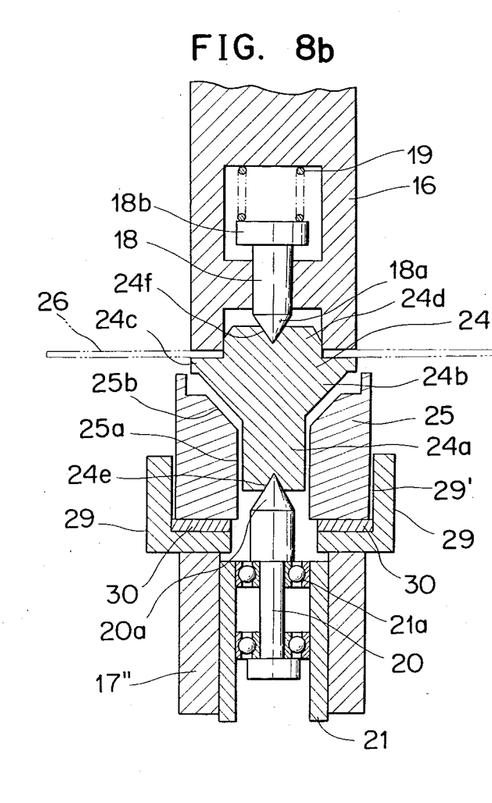

FIG. 7 illustrates a positioning rotating mechanism provided at a stopping position of the carrier 25. The positioning rotating mechanism includes an upper rotary shaft 16 and a vertically movable lower rotary shaft 20. The upper rotary shaft 16 has a recess 16a formed at a lower end thereof, and a conical engaging projection 18a of the engaging element 18 is located in the recess 16a of the upper rotary shaft 16. The engaging element 18 is supported for sliding movement in a hole 16c formed in a partition wall 16b of the upper rotary shaft 16 and is urged downwardly by a spring 19 located between an abutting flange portion 18b of the engaging element 18 and the upper rotary shaft 16. The lower rotary shaft 20 is supported for rotation relative to a housing 21 by means of a bearing 21a. The housing 21 is mounted for sliding movement relative to a guide tube 17" located below the transporting tables 29 and is thus slidably moved up and down by a pneumatic mechanism (not shown). The conical engaging projection 20a is provided at an upper end of the lower rotary shaft 20.

In the device having such a construction as described above, a disk member 26 is positioned on the flange portion 24c of floating shaft 24 with a center hole thereof engaged with the circular projection 24d of the floating shaft 24, and the carrier 25 is moved while air is jetted from the air blow-out hole 31b. In this condition, the disk member 31 is transported in a slightly upwardly spaced relationship from the flange portion 24c of the floating shaft 24 and the upper faces 31a of the tables 31 thus without being contacted with them.

At a stopping position of the carrier 25, the lower rotary shaft 20 is moved up to lift the disk member 26 until the disk member 26 is clamped between the flange portion 24c of the floating shaft 24 and the lower end of the upper rotary shaft 16. In this clamped condition, the disk member 26 is rotated to effect working thereof.

It is to be noted that where it is necessary to accumulate, on a transporting conveyor, carriers on which disk members are loaded, the whole length of the carrier may be designed to be greater than the outer diameter of the disk member in order to prevent the disk members from being contacted with each other. In this embodiment, flexible disk members can be transported smoothly while they are protected against deformation and damage, and at a stopping position of a carrier, a disk member can be promptly rotated to effect working thereof.

Figure 9:
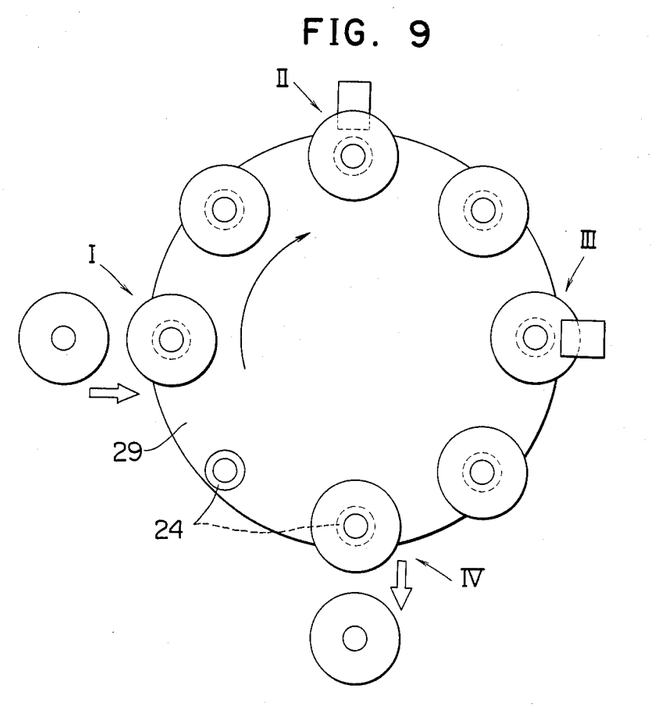
FIG. 9 is a diagrammatic representation of a further embodiment of the invention.

It is desirable that the support 25 serving as transporting means for moving the floating shaft 24 with disk 26 loaded thereon horizontally relative to the aligned relative to the aligned axis of the upper and lower rotary shafts is secured to the conveyors 30 in order to put the invention into practice more effectively. Instead of the conveyor, the support 25 may be secured to a rotary index table or a pallet transfer device. FIG. 9 illustrates a still further embodiment having such a construction as described just above, wherein a plurality of floating shafts 24 are held in respective support holes formed in a circumferential row at a predetermined interval in a rotary index table 29 which makes an indexing rotation in a direction as shown by an arrow mark. Index positions I, II, III and IV around the table 29 provide a disk loading station, a polishing station, an inspecting station and an unloading station, respectively. In the polishing inspecting stations, the pair of rotary shafts 16 and 20 are adapted to be arranged for axial alignment with the floating shafts 24.

Figure 10:
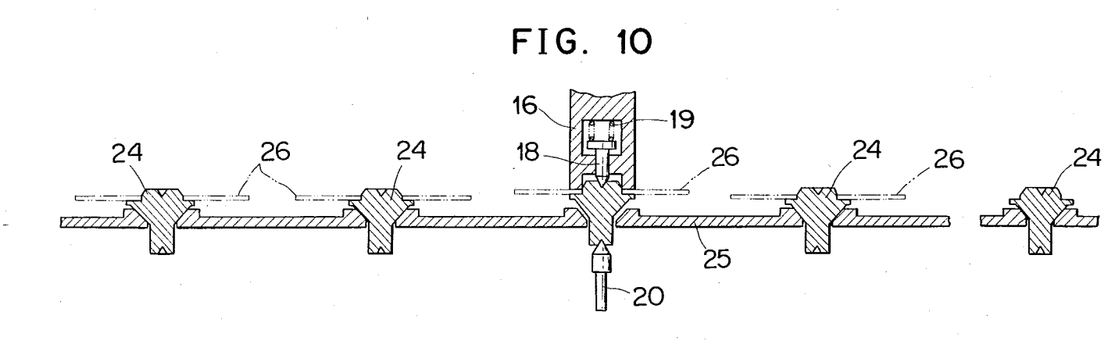
FIG. 10 is a diagrammatic representation a still further embodiment of the invention.

FIG. 10 illustrates a still further embodiment, wherein a plurality of supports 25 are held in respective support holes formed in a row at a predetermined interval therebetween in an indexing belt conveyor which is driven by an indexing drive device not shown.

As apparent from the foregoing description, according to the present invention, a floating shaft is provided between upper and lower rotary shafts and a disk is clamped between the floating and one of the upper and lower rotary shafts. Accordingly, dislocation of axes between the upper and lower rotary shafts can be minimized due to the presence of the floating shaft, and hence, even during rotation at a high speed, vibrations are not caused at the clamping portion.

What is claimed is:

1. A high speed rotational supporting device comprising a pair of spaced opposed rotary shafts extending along a common axis, at least one of said rotary shafts adapted for movement toward and away from the other rotary shaft; and a floating shaft positioned along the common axis and interposed between said pair of rotary shafts and having axially aligned engaging means at axial ends thereof for engaging said pair of rotary shafts rotatably;

said floating shaft having a circumferentially extending disc support flange at an intermediate point and a selected one of said pair of rotary shafts having clamp means for clamping a disc between it and the disc support flange.

2. A high speed rotational supporting device according to claim 1, wherein said pair of rotary shafts having respective engaging elements formed with conical engaging projection in facing relation to said floating shaft; and said floating shaft being formed with respective conical engaging recess at axial ends thereof and adapted for engagement with said engaging elements.

3. A high speed rotational supporting device according to claim 2, wherein said selected one of the rotary shafts, supports the engaging element slidably, said selected one of the rotary shafts and the engaging element being provided with a spring therebetween to bias the engaging element toward the floating shaft.

4. A high speed rotational supporting device according to claim 2, wherein said clamp means includes a cylindrical section extending from said selected one of the rotary shafts toward the floating shaft; and said floating shaft is formed with a flanged portion having a face at an axial end portion thereof facing the floating shaft to abut against said cylindrical section.

5. A high speed rotational supporting device according to claim 1, wherein said floating shaft has an inverted conical section and a cylindrical section extending form a converging end thereof.

6. A high speed rotational supporting device accofding to claim 5, further including a carrier block having a through hole to receive said floating shaft therein, said through hole having an inverted conical section and a cylindrical section.

7. A high speed rotational supporting device according to claim 5, further including transporting means having through holes at predetermined interval therebetween to receive said floating shaft therein, each through hole having an inverted conical section and a cylindrical section;

said transporting means being adapted for indexing motion and to stop at predetermined indexing positions;

said pair of rotary shafts being arranged to axially coincide with said floating shaft at least one of the indexing positions.

8. A high speed rotational supporting device according to claim 6, further including a belt conveyor for conveying said carrier block.

9. A high speed rotational supporting device according to claim 7, wherein said transporting means includes a rotary index table.

10. A high speed rotational supporting device according to claim 7, wherein said transporting means includes an indexing belt conveyor.

* * * * *